C. W. Sanborn.
Horse Rake.
No. 95147.  Patented Sep. 21, 1869.
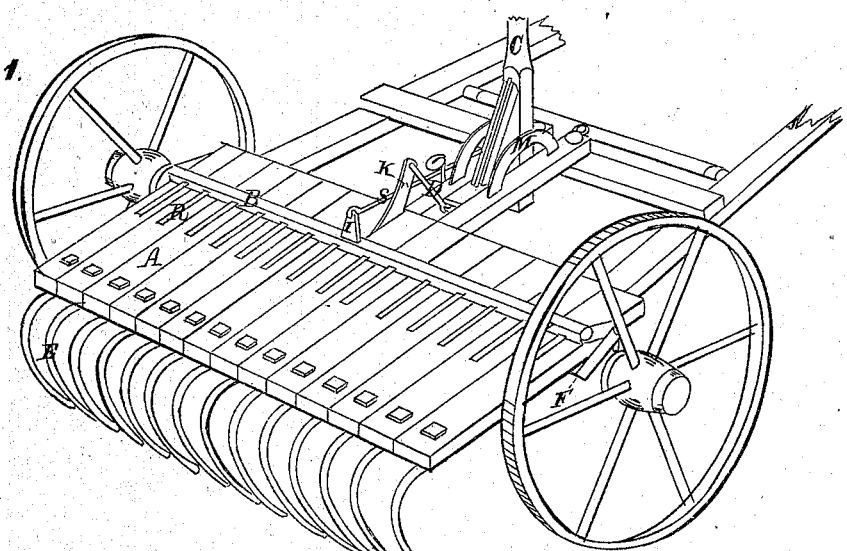
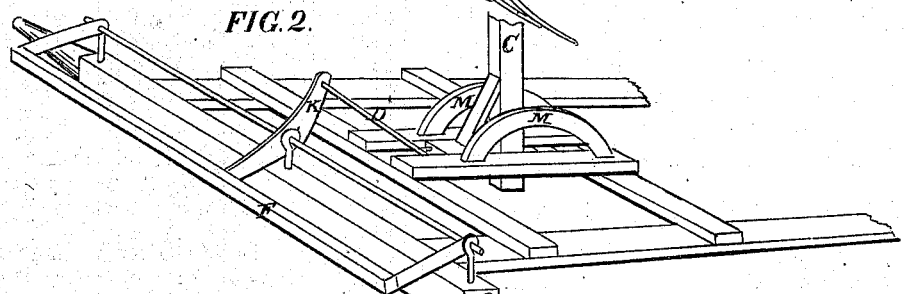
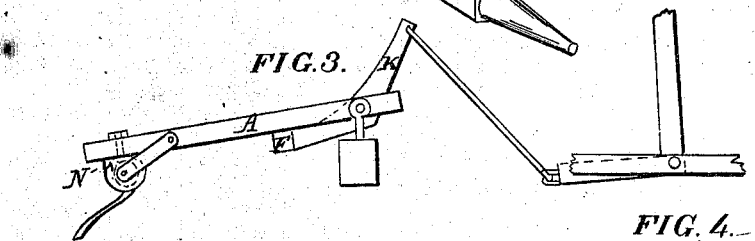
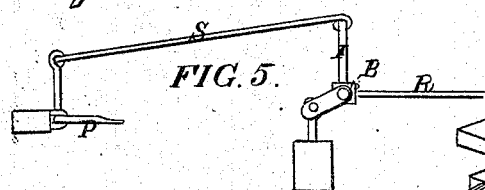
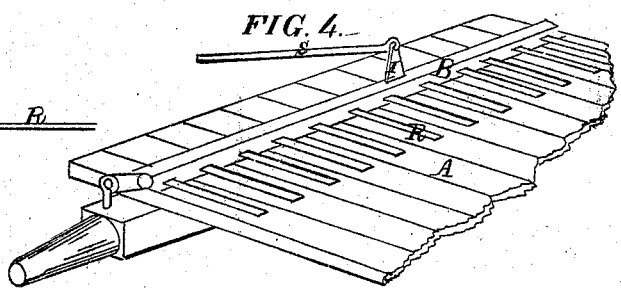
Witnesses
E. W. Anderson
D. D. Kane
Inventor
C. W. Sanborn
Chipman, Hosmer & Co
Attys

United States Patent Office.

CHARLES W. SANBORN, OF MORRILL, MAINE.

Letters Patent No. 95,147, dated September 21, 1869.

IMPROVEMENT IN HORSE-RAKES.

The Schedule referred to in these Letters Patent and making part of the same.

Be it known that I, CHARLES W. SANBORN, of Morrill, in the county of Waldo, and State of Maine, have invented a new and useful Improvement in Horse-Rakes; and I do hereby declare that the following is a full, clear, and exact description of the construction and operation of the same, reference being had to the annexed drawings, making a part of this specification, in which—

Figure 1 is a perspective view of the whole rake;

Figure 2, a perspective view of the dump-brake;

Figure 3, an outline view of the dump-brake;

Figure 4, a perspective view of the adjusting-bar; and

Figure 5, an outline view of the adjusting-bar.

Letter A represents the lags to which the teeth are attached;

B, the adjusting-bar that crosses on the upper side of the forward ends of the lags;

R, the steel springs attached to the adjusting-bar and run out over the lags;

F, that part of the dump-brake that is placed under the lags to raise and lower the teeth;

N, the fastenings of the teeth to the pulleys and lags;

E, the teeth;

C, the handle of the dump-brake;

M, the circular plates of iron on the sides of the handle, through which the pin passes to hold the handle in its place after having been pulled forward, and the teeth raised from the ground for the purpose of moving the rake from place to place when not raking;

D, the connecting-rod between the lower end of the handle and the upper end of the dump-brake;

I, the post in the centre of the adjusting-bar;

K, the upper end of the dump brake;

S, the rod attached to the post in the centre of the adjusting-bar; and

P, the post for the raker to press his foot upon when he desires to hold the teeth down, as that forces the steel springs of the adjusting-bar upon the lags to which the teeth are attached.

The construction and operation of the rake are as follows, to wit:

It is placed on two wheels, an axle-tree, and shafts, similar to those of a common wagon, and is drawn by one horse, driven by a person sitting on the seat.

It has six short iron bolts standing upright in the upper side of the axle-tree, with holes in the upper ends; eighteen lags, to which the teeth are attached, all independent in their action, all rising and falling separately or together, according to the evenness or unevenness of the ground upon which the rake is operating, and thus, when raking uneven lands, allows the teeth to play into the hollows and over the knolls with ease, and thereby rake the hollows clean without bearing so hard on the knolls as to destroy the grass-roots and rake up dirt with the hay.

It has a bar of iron which passes through the forward ends of the lags, and through the holes in the upright bolts, and the iron plates by which the dump-brake and adjusting-bar are held to said iron bar, and on which they turn, and which holds the lags and teeth in their places, and is the pivot on which the lags turn when lifted up or lowered by the dump-brake in raking.

The teeth are fastened by passing the upper ends around pulleys placed under the outer ends of the lags; then passing the teeth up through the lags, and fastening them with nuts on top, and with iron braces at the sides, and with bolts passing through the braces, lags, and pulley, secured by nuts.

The adjusting-bar extends across the forward ends of all the lags, and is fastened by short iron plates, one at each end.

The iron bar that passes through the lags also passes through the lower ends of these iron plates, and is the pivot on which the plates and adjusting-bar turn.

The upper ends of the plates are fastened to the ends of the adjusting-bar with bolts.

Eighteen steel springs are attached to the adjusting-bar, one over each lag, which, by pressing the foot on the lower end of the rod attached to the adjusting-bar, raises the adjusting-bar, and forces the steel springs upon the lags, and thus holds the lags and teeth down, which is necessary, in raking, where the hay is uneven in its growth.

In raking such fields of hay, in places where the growth is greatest, the rake often gets full of hay, and the teeth are forced up from the ground before the rake gets to the windrow. The object of the adjusting-bar is, at such times, to hold the teeth down, and thus rake and carry the hay to the line of the windrow.

The dump-brake consists of a bar under the forward ends of the lags, and is fastened similar to the adjusting-bar, and turns on the same pivot.

An iron plate attached to the bar passes up between the two centre lags, to which is attached a rod, which passes down from the upper end of the plate to the arm of the handle to the brake, and is attached thereto.

The use of the dump-brake is to raise and lower the lags and teeth in raking. The raker sits on the seat, and when he wishes to raise the teeth to dump or drop the hay in the windrow, he pulls the handle toward him, or presses his foot on the rod. When he wishes to lower the teeth again for raking, he shoves the handle from him, and, when not raking, he wishes to hold the teeth up from the ground, in taking the rake from place to place, he pulls the handle toward him, and holds it there by putting the pin through the holes in the iron plates by the sides of the handle, and thus holds the teeth up till he reaches the field to be raked.

What I claim as my invention, and desire to secure by Letters Patent, is—

1. The rollers or pulleys around which the teeth are wound, substantially as described.

2. The rollers N, teeth-bars A, and lifting-lever C, the whole arranged and operating as described.

CHARLES W. SANBORN.

Witnesses:
 NEHEMIAH ABBOTT,
 REUBEN HIGGINS.